(12) United States Patent
McMullen et al.

(10) Patent No.: US 8,390,631 B2
(45) Date of Patent: Mar. 5, 2013

(54) SYNCHRONIZING QUEUED DATA ACCESS BETWEEN MULTIPLE GPU RENDERING CONTEXTS

(75) Inventors: Max Alan McMullen, Redmond, WA (US); Kanishka Shrivastava, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 12/137,209

(22) Filed: Jun. 11, 2008

(65) Prior Publication Data
US 2009/0313622 A1 Dec. 17, 2009

(51) Int. Cl.
*G06F 15/00* (2006.01)
*G06F 15/16* (2006.01)
*G06F 15/80* (2006.01)

(52) U.S. Cl. ........ 345/505; 345/501; 345/502; 345/503; 345/504

(58) Field of Classification Search ........... 345/501–505
See application file for complete search history.

(56) References Cited

U.S. PATENT DOCUMENTS

| | | |
|---|---|---|
| 6,891,543 B2 | 5/2005 | Wyatt |
| 6,947,051 B2 | 9/2005 | Gossalia |
| 7,088,374 B2 | 8/2006 | David |
| 7,755,632 B2 * | 7/2010 | Brothers et al. ............ 345/520 |
| 2003/0140179 A1 | 7/2003 | Wilt |
| 2004/0187122 A1 * | 9/2004 | Gosalia et al. ............ 718/100 |
| 2007/0091097 A1 | 4/2007 | Zhang |
| 2007/0091099 A1 | 4/2007 | Zhang |
| 2007/0091100 A1 | 4/2007 | Brothers |
| 2007/0091102 A1 | 4/2007 | Brothers |

OTHER PUBLICATIONS

Copying and Accessing Resource Data (Direct3D 10), http://msdn2.microsoft.com/en-us/library/bb205132(VS.85).aspx, Jan. 3, 2008.
The PeakStream Platform: High Productivity Software Development for Multi-Core Processors, http://www.linuxclustersinstitute.org/conferences/archive/2007/PDF/papakipos_21367.pdf, 2006.
Andrews, Threading the OGRE3DRender System, http://cache-www.intel.com/cd/00/00/33/13/331357_331357.pdf, 2006.
Direct3D Resources Can Now Be Shared Between Devices or Processes, http://msdn2.microsoft.com/en-us/library/bb219800.aspx, Jan. 3, 2008.

* cited by examiner

*Primary Examiner* — Hau Nguyen
(74) *Attorney, Agent, or Firm* — Shook Hardy & Bacon LLP

(57) ABSTRACT

Synchronized access to a shared surface from multiple rendering contexts is provided. Only one rendering context is allowed to access a shared surface at a given time to read from and write to the surface. Other non-owning rendering contexts are prevented from accessing and rendering to the shared surface while the surface is currently owned by another rendering context. A non-owning rendering context makes an acquire call and waits for the surface to be released. When the currently owning rendering context finishes rendering to the shared surface, it release the surface. The rendering context that made the acquire call then acquires access and renders to the shared surface.

14 Claims, 7 Drawing Sheets

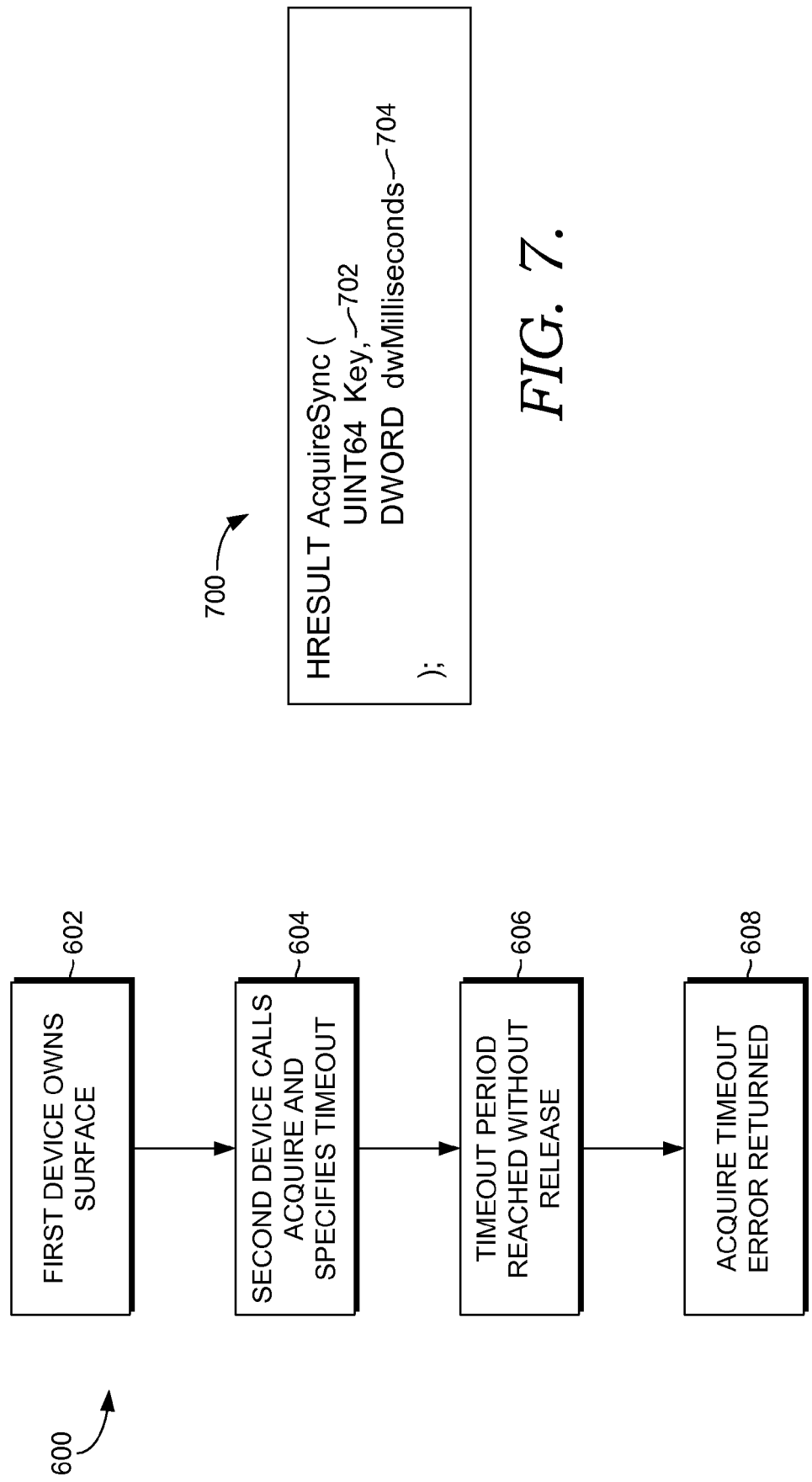

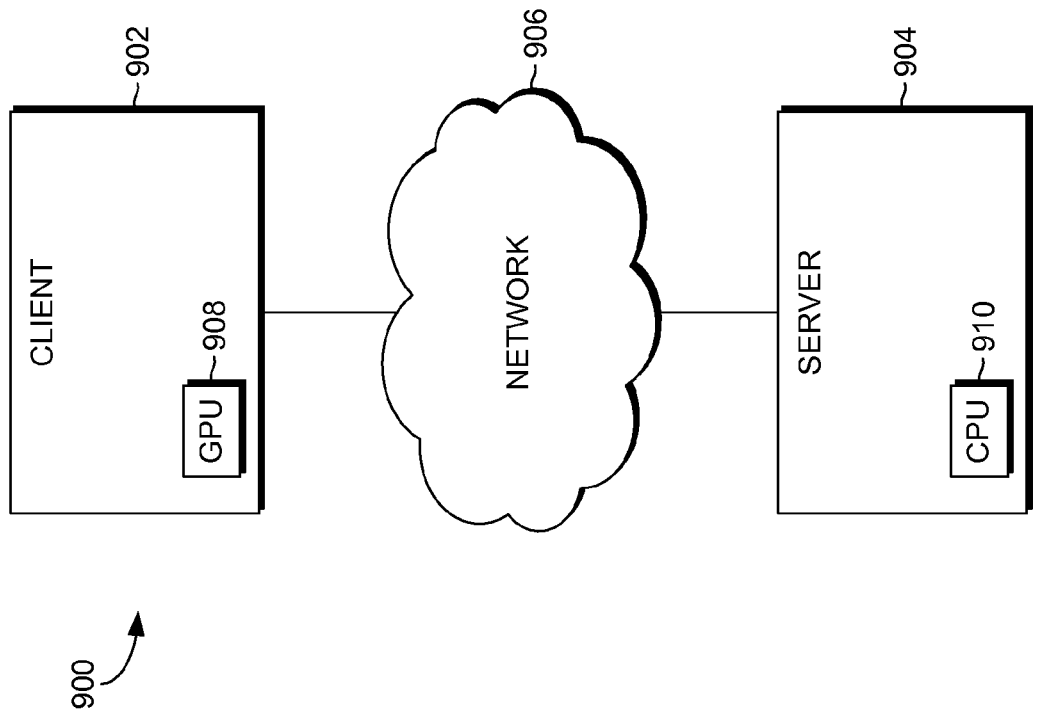

SYNCHRONIZING QUEUED DATA ACCESS BETWEEN MULTIPLE GPU RENDERING CONTEXTS

BACKGROUND

A variety of different graphics/presentation application programming interfaces (APIs) have been developed for handling tasks related to rendering graphics in computing systems. The graphics/presentation APIs generally facilitate the ability to render objects (e.g., triangles, polygons, etc.) for presentation. Each of the graphics/presentation APIs have different strengths and weaknesses relative to one another. For example, some graphics/presentation APIs may be optimized for rendering complex, three-dimensional graphics for gaming and other multimedia applications. However, such APIs may be very complex and not well-suited for rendering simpler graphics such as text. Alternatively, other graphics/presentation APIs may be simpler and optimized for rendering text but are not well-suited for handling more complex graphics. Given the available graphics/presentation APIs, when developing applications, application developers may wish to leverage the particular strengths of each graphics/presentation API depending on the type of graphics to be rendered for their applications.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing multiple rendering contexts with synchronized access to a shared surface that comprises an allocation of video memory. In accordance with embodiments of the present invention, only one rendering context may "own" or have access to a shared surface at a given time, allowing that rendering context to read from and write to the shared surface. Other non-owning rendering contexts are prevented from accessing and rendering to the shared surface while the surface is owned by another rendering context. If a non-owning rendering context wishes to acquire access to render to the shared surface, the non-owning rendering context makes an acquire call and waits until the surface is released by the currently owning device. When the currently owning device finishes rendering, it releases the shared surface. The rendering context that made the acquire call may then acquire access to the shared surface and begin rendering to the surface.

BRIEF DESCRIPTION OF THE DRAWINGS

The present invention is described in detail below with reference to the attached drawing figures, wherein:

FIG. 6 is a flow diagram showing a method for method for using timeouts in a synchronized access to a shared surface in accordance with an embodiment of the present invention;

FIG. 7 illustrates an acquire API call in accordance with an embodiment of the present invention;

FIG. 8 illustrates a release API call in accordance with an embodiment of the present invention; and FIG. 9 is a block diagram illustrating a client/server environment in which embodiments of the present invention may be employed.

DETAILED DESCRIPTION

Figure 1:
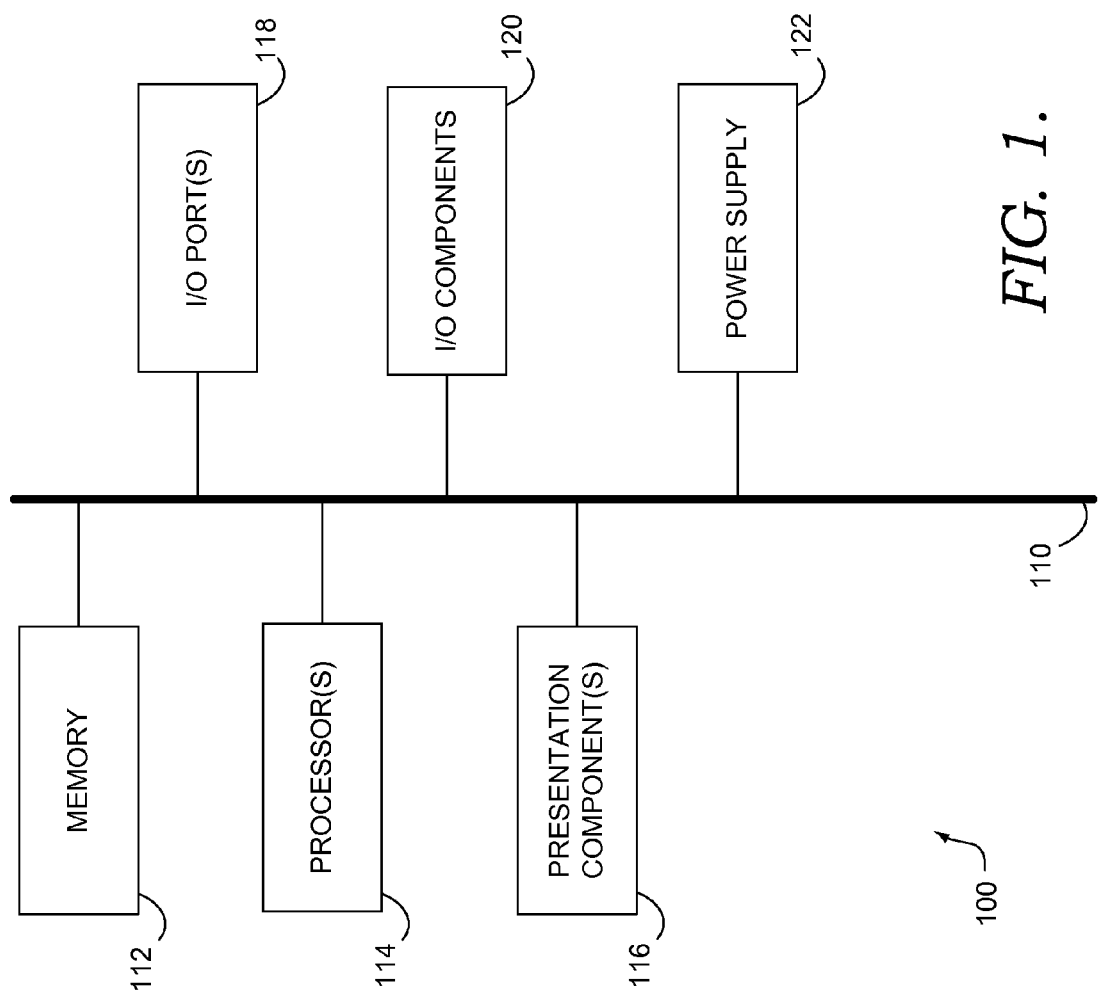
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for, among other things, synchronized access to shared surfaces. Embodiment may include graphics processing unit (GPU) synchronization and/or central processing unit (CPU) synchronization. As used herein, the term "surface" refers to an allocation of video memory that is the target for rendering by a GPU. The video memory, for instance, may represent graphics that could be displayed by the computing system. In embodiments of the present invention, a surface may be shared by multiple graphics devices in different processes/threads such that the graphics devices may render to the same surface (i.e., a shared surface). As used herein, the term "graphics device" or "device" refers to a rendering context or thread of execution on the GPU. In some cases, each device could use a different graphics API such that different graphics APIs may render to the same shared surface. For instance, an application could include a device that uses a first API to render three-dimensional content and a device that uses a second API to render text for a user interface for the same surface.

In accordance with embodiments, access to a shared surface by multiple devices is synchronized. This enforces the proper ordering in which devices may render to the shared surface. In particular, only one device may access or "own" a surface at any given time. When a device accesses or owns a surface, the device can read from and write to the surface and other non-owning devices cannot access the surface to read from and/or write to the surface. In some embodiments, synchronization objects are provided to control access to a shared surface. The synchronization objects include an acquire synchronization object and a release synchronization object. The acquire synchronization object is an API that allows a device to gain access to a surface for rendering. The release synchronization object is an API that allows a device to release access to the surface to allow other devices to render to it.

When a shared surface is currently owned by a device, another device that currently does not own the surface but wishes to render to the shared surface calls the acquire synchronization object. The acquiring device then must wait until the surface is released by the currently owning device. When the currently owning device finishes rendering to the shared surface, it calls the release synchronization object to release the shared surface. After the shared surface is released, the acquiring device may complete the acquire call to acquire access to the shared surface and render to the surface.

Accordingly, in one aspect, an embodiment of the present invention is directed to a method for synchronizing access to a shared surface. The method includes allowing a first rendering context to acquire access to a shared surface to render to the shared surface, wherein other rendering contexts are prevented from accessing the shared surface while the first rendering device has access to the shared surface. The method also includes receiving an acquire call for a second rendering context indicating that the second rendering context is attempting to access and render to the shared surface, wherein the second rendering context is prevented from accessing the shared surface until the first rendering context releases the shared surface. The method further includes receiving a release call indicating that the first device is releasing the shared surface. The method still further includes allowing the second rendering context to access the shared surface to render to the shared surface based on the release call.

In another embodiment, an aspect of the invention is directed to one or more computer-storage media having computer-useable instructions embodied thereon for performing a method for synchronizing access to a shared surface. The method includes allowing a first rendering context to acquire access to a shared surface to render to the shared surface. The method also includes receiving, for a second rending context, a call to acquire access to the shared surface. Based on the acquire call, a wait packet is placed on a GPU queue for the second rendering context. The method further includes receiving rendering commands from the second rendering context and queuing the rendering commands behind the wait packet on the GPU queue. The wait packet prevents the rendering commands from the second rendering context from being executed by the GPU. The method also includes receiving, for the first rendering context, a call to release access to the shared surface. Based on the release call, a signal packet is placed on the GPU queue. Additionally, based on the signal packet, the second rendering context is allowed to acquire access to the shared surface. The method further includes executing the rendering commands from the second rendering context to render to the shared surface.

A further embodiment of the invention is directed to one or more computer-storage media having computer-useable instructions embodied thereon for performing a method for synchronizing access to a shared surface. The method includes allowing a first rendering context to acquire access to a shared surface, wherein other rendering contexts are prevented from accessing the shared surface while the first rendering context has acquired the shared surface. The method also includes receiving, for a second rendering context, a call to acquire access to the shared surface. Based on the acquire call, a CPU wait is placed on a CPU for the second rendering context. The method further includes receiving, for the first rendering context, a call to release access to the shared surfaced. Based on the release call, a GPU signal is placed on a GPU and a CPU signal is placed on the CPU. Based on the CPU signal, a GPU wait is placed on the GPU for the second rendering context and rendering commands for the second rendering context are queued behind the GPU wait on the GPU.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
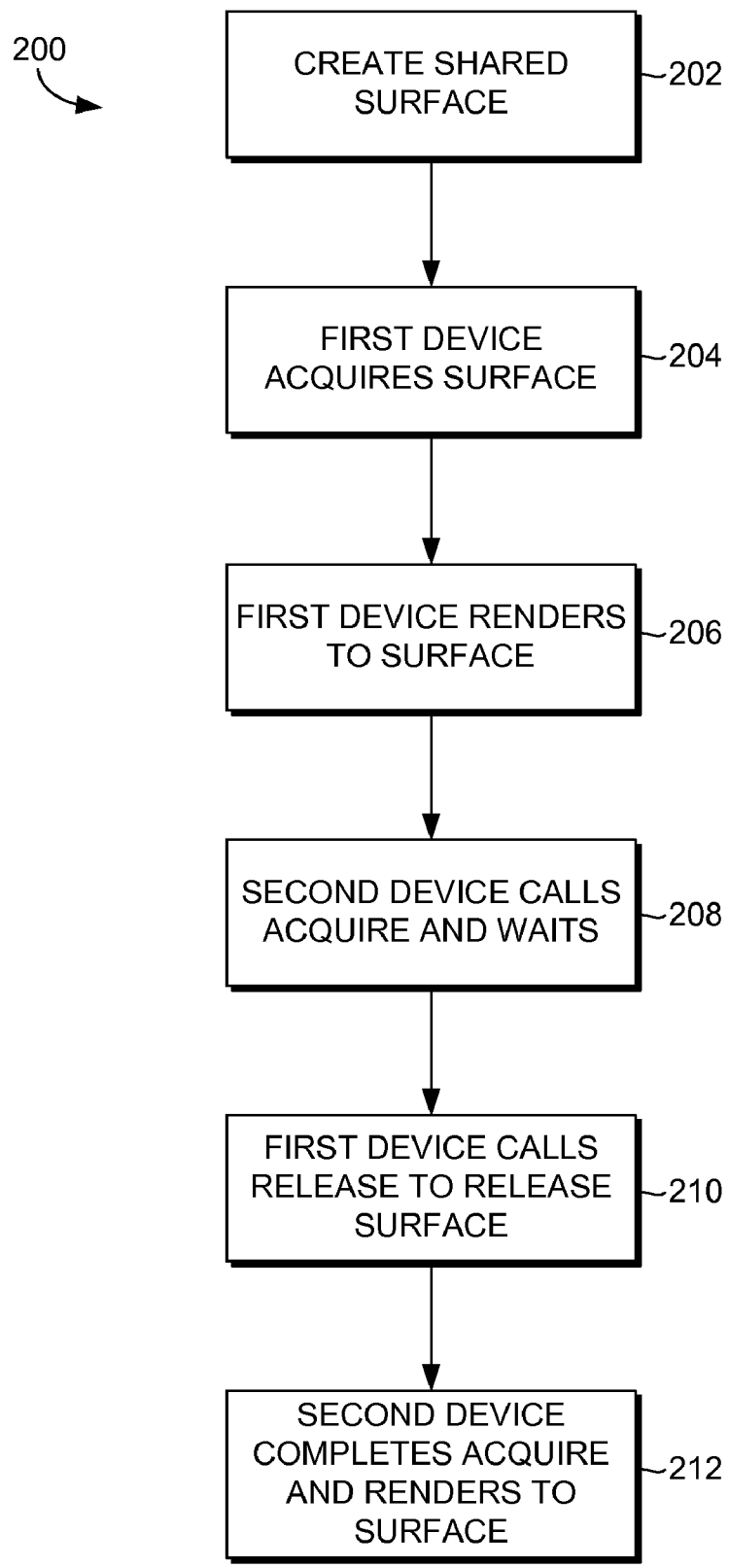
FIG. 2 is a flow diagram showing an overall method for synchronizing access to a shared surface in accordance with an embodiment of the present invention.

Referring now to FIG. 2, a flow diagram is provided illustrating an overall method 200 for synchronizing access to a shared surface in accordance with an embodiment of the present invention. Initially, as shown at block 202, a shared surface is created. When the surface is initially created, the surface may be unowned and any device may attempt to acquire the surface. As shown at block 204, a first device calls an acquire command to gain access to the shared surface. After acquiring access to the shared surface, the first device renders to the surface, as shown at block 206. Because only one device may own the shared surface at any given time, other devices are blocked from reading from and writing to the surface. For instance, at the API level, the APIs may treat the surface as if it's not really there or as if the memory contents are hidden. If a device that does not own the surface attempts to write to the surface, the data being written out disappears and is not written to the surface. Additionally, if a device that does not own the surface tries to read from the surface, no data from the surface is returned.

When a second device wishes to access and render to the shared surface, the second device calls an acquire command, as shown at block 208. Because the first device currently owns the shared surface, the second device is blocked from rendering to the shared surface and must wait until the first device releases the shared surface. When the first device finishes rendering to the surface, the first device calls a release command to release the surface, as shown block 210. The release call queues a signal command to unblock the second device. Accordingly, as shown at block 212, the second device acquires the shared surface and begins rendering to it. Additionally, since the first device is no longer using the shared surface, the first device may perform other CPU work.

The method described above with reference to FIG. 2 describes a general process in which two devices are attempting to render to a shared surface. In practice, however, multiple different devices may be attempting to render to a shared surface. In such cases, the order in which acquire and release calls are made does not necessarily directly relate to the order in which rendering commands are executed on the GPU. In order to enforce GPU rendering order in some embodiments, acquire and release calls will take "key" parameters that represent points in time. An acquire call with a particular key will only succeed when the device that currently owns the surface makes a release call with the same key. Accordingly, different devices can rely on this key to enforce correct ordering.

Figure 3:
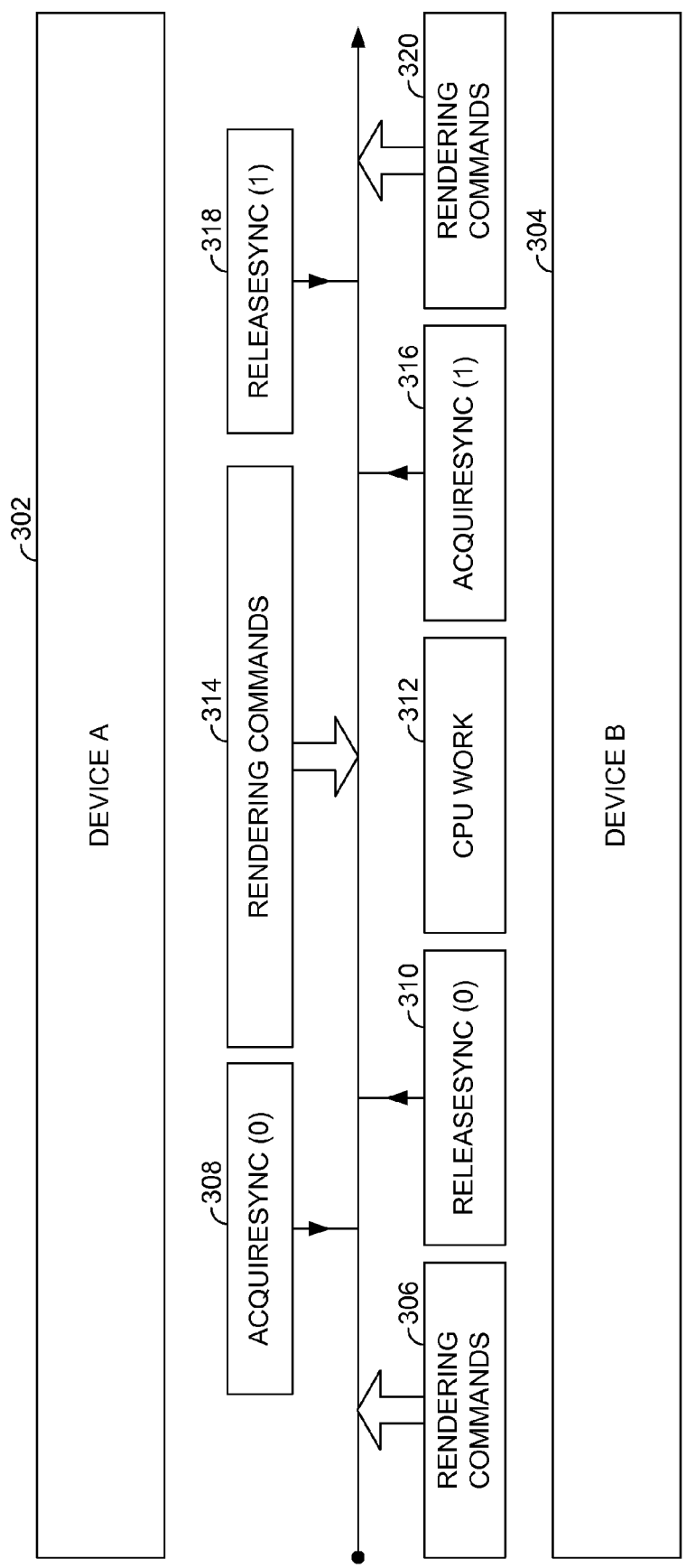
FIG. 3 is a block diagram illustrating a simplified timeline for synchronizing access to a shared surface using keys in accordance with an embodiment of the present invention.

By way of illustration, FIG. 3 provides a block diagram showing a simplified timeline depicting the use of keys to provide synchronized access to a shared surface in accordance with an embodiment of the present invention. In the example of FIG. 3, device A 302 and device B 304 are attempting to render to a shared surface. Although only two devices are shown in FIG. 3 for simplification and clarity purposes, as noted above, in practice, more than two different devices often may be attempting to render to a shared surface.

Initially, device B 304 owns the shared surface and is issuing rendering commands 306 to the surface. Device A 302 makes an acquire call 308 and waits for the call to complete. The acquire call 308 from device A includes the key "0." Accordingly, the call 308 will be completed only when an owning device calls a release using the same key "0." In the present example, device B 304 makes a release call 310 to release access to the surface and specifies the key "0." Because device B 304 releases using the same key specified in the acquire call 308 from device A 302, device A 302 may complete the acquire call 308 and begin rendering 314 to the shared surface.

After releasing the surface, device B 304 performs CPU work 312 and then makes an acquire call 316 to render to the shared surface again. The acquire call 316 from device B 304 includes the key "1." When device A 302 finishes rendering to the shared surface, it makes a release call 318 to release access to the surface. The release call 318 from device A 302 specifies the key "1." Because the key specified by the acquire call 316 from device B 304 matches the key specified by the release call 318 from device A 302, the acquire call 316 from device B 304 completes and device B 304 may begin rendering 320 to the shared surface.

Keys may be assigned to devices in a variety of different manners within the scope of embodiments of the present invention. By way of example only and not limitation, in some embodiments, an application may specify an order for rendering graphics that controls how keys are assigned to devices to enforce proper ordering. In some cases, key values may be dynamically allocated depending on what rendering needs to be performed by successively incrementing the key value. As a device needs a surface, the device would be allocated the previous allocated key value plus one. The device would then release on its key value plus one. In some instances, a number of devices may be attempting to access a shared surface that do not require a particular order. In such instances, the devices could all use the same key value and any (arbitrarily chosen) one of the waiting devices with the same key value could be allowed to access the shared surface when a release is called with that key value. Any and all such variations are contemplated to be within the scope of embodiments of the present invention.

Figure 4:
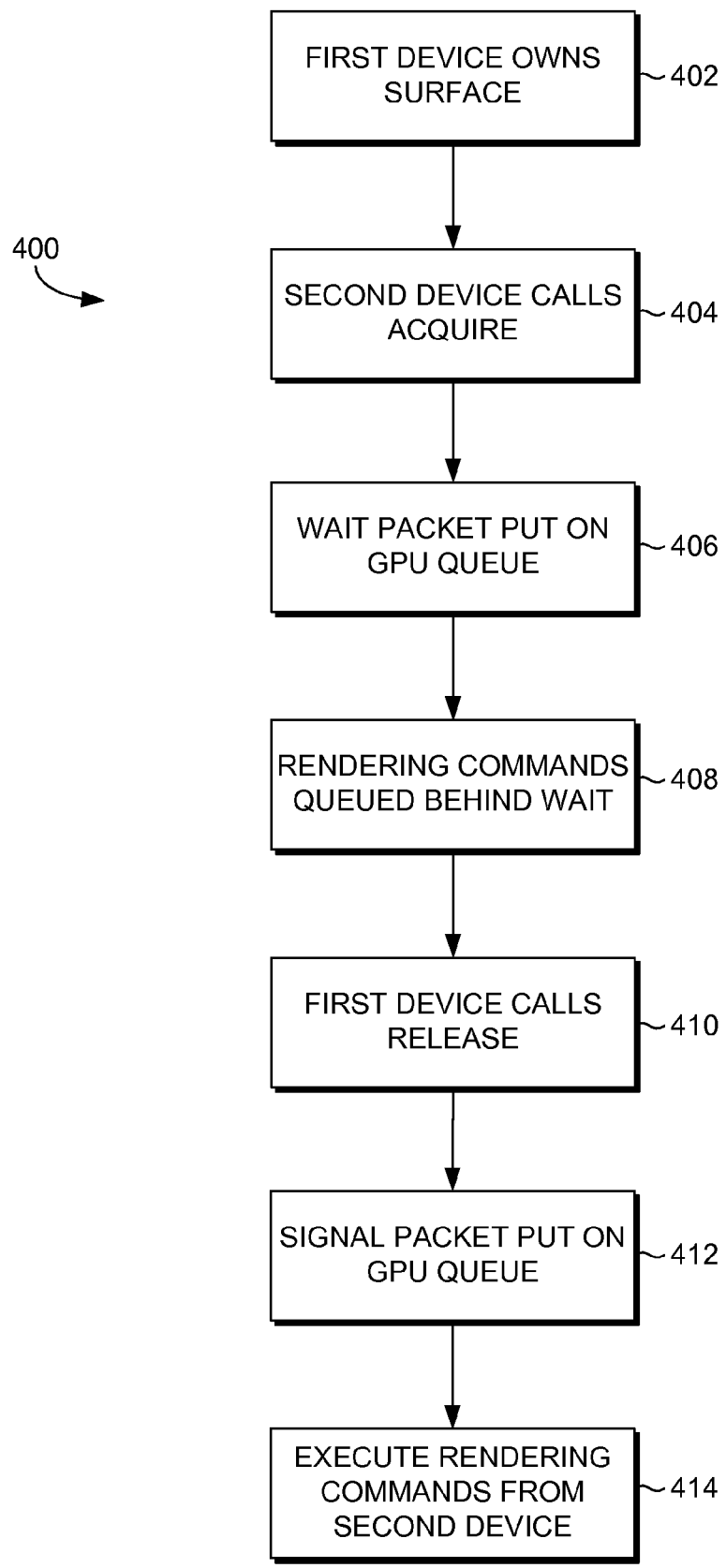
FIG. 4 is a flow diagram showing a method for using GPU synchronization for synchronized access to a shared surface in accordance with an embodiment of the present invention.

In embodiments of the present invention, the acquire and release synchronization objects employ wait and signal calls to respectively prevent and allow an acquiring device to render to a shared surface. In one embodiment, GPU synchronization is employed using GPU waits and signals, while in another embodiment, CPU and GPU synchronization is employed using both CPU and GPU waits and signals. Referring first to FIG. 4, a flow diagram is provided illustrating a method 400 for employing GPU synchronization using GPU waits and signals to synchronize rendering to a shared surface in accordance with an embodiment of the present invention. Initially, as shown at block 402, a first device owns the shared surface and is rendering to the surface. While the first device owns and renders to the surface, a second device wishes to render to the surface and makes an acquire call, as shown at block 404. A wait packet is put on the GPU queue at block 406, and the second device issues rendering commands that are queued behind the wait packet at block 408. The wait packet prevents the rendering commands from the second device from being executed by the GPU until the currently owning device (i.e., the first device) makes a release call to release the surface.

As shown at block 410, the first device issues a release call to release the shared surface. During the release call, a signal packet is put on the GPU queue, as shown at block 412. Based on the signal packet, the second device acquires access to the shared surface and the rendering commands from the second device are executed, as shown at block 414. Although not discussed, the above-described method may employ keys to enforce ordering. For instance, the wait packet from the second device and the signal packet from the first device may each specify a particular key value. The second device will acquire the surface only if the key value specified by the wait packet matches the key value specified by the signal packet.

In embodiments that employ only GPU synchronization such as that described above with reference to FIG. 4, rendering commands from an acquiring device are queued behind a wait packet, thereby consuming GPU memory in terms of the command buffer. The rendering commands from the acquiring device will not execute until a signal from the currently owning device is received. If the release signal is delayed and/or there are a large number of acquiring devices, a large amount of rendering commands may be placed on the GPU queue, thereby consuming a large portion of the GPU memory. To address this issue, some embodiments employ CPU synchronization in addition to GPU synchronization, as indicated above. In particular, waits and signals are placed on the CPU as well as the GPU during acquire and release calls. By employing a CPU wait, an acquiring device is forced to wait on the CPU until the currently owning device places a signal on both the GPU and the CPU. Accordingly, a large amount of rendering is not placed on the GPU queue without any guarantee the currently owning device will release the surface so that the rendering commands from the acquiring device will execute.

Figure 5:
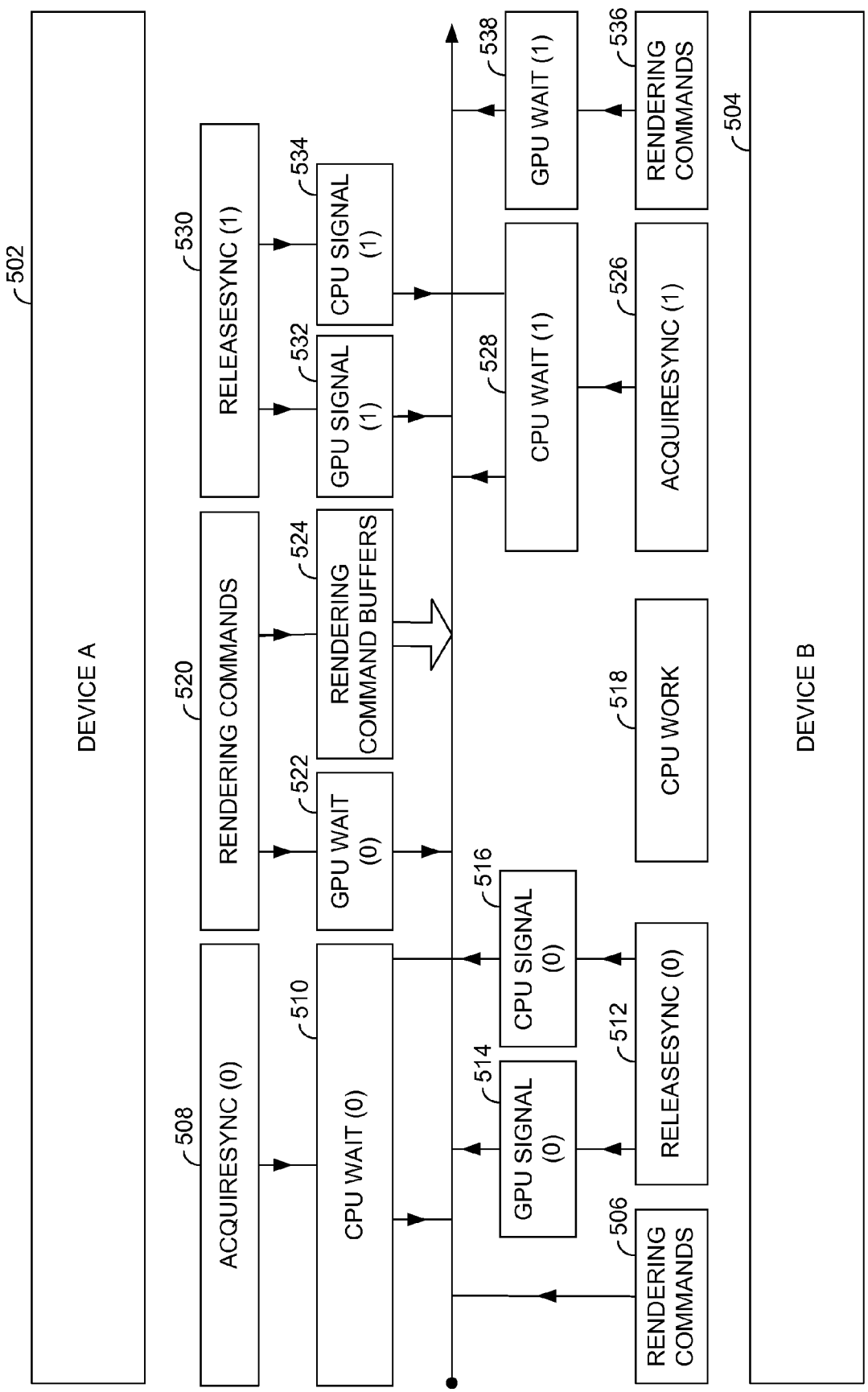
FIG. 5 is a block diagram illustrating a timeline for synchronizing access to a shared surface using both CPU and GPU synchronization in accordance with an embodiment of the present invention.

Turning now to FIG. 5, a block diagram is provided illustrating a timeline for synchronizing access to a shared surface using both CPU and GPU synchronization in accordance with an embodiment of the present invention. As shown in FIG. 5, two devices, device A 502 and device B 504, are attempting to render to a shared surface. Initially, device B 504 owns the surface and is issuing rendering commands 506. Device A 502 calls an acquire synchronization API 508 using the key "0," and a CPU wait 510 (with the key "0") is placed on the CPU for a release to be called using the same key. The CPU wait 510 prevents rendering commands from device A 502 from being issued to the GPU.

When device B 504 finishes its rendering, it calls a release synchronization API 512 that specifies the key "0." The release synchronization API 512 places a GPU signal packet 514 (with the key "0") on the GPU scheduler queue. A CPU signal packet 516 (with the key "0") is also placed on the CPU so another device may access the shared surface. After releasing the surface, device B 504 may then do CPU work 518.

Because the key specified by the CPU wait 522 from device A 502 matches the key specified by the CPU signal 516, device A 502 may acquire the shared surface and begin issuing rendering commands 520. Before queuing any rendering commands to the shared surface, a GPU wait packet 522 (with the key "0") is placed on the GPU scheduler queue. Device A 502 then starts queuing rendering commands 524 to the GPU buffer.

In the present example shown in FIG. 5, device B 504 wishes to render to the shared surface again and calls an acquire synchronization API 526 specifying the key "1." A CPU wait 528 (with the key "1") is placed on the CPU that prevents rendering commands from device B 504 from being issued to the GPU until the surface is released and device B 504 may acquire the surface.

When device A 502 is done with the surface, it calls a release synchronization API 530, specifying the key "1." The release synchronization API 530 puts a GPU signal packet 532 (with the key "1") on the GPU scheduler queue, and a CPU signal packet 534 (with the key "1") is placed on the CPU. Because the key specified by the CPU wait 528 from device B 504 matches the key specified by the CPU signal 534 from device A 502, device B 504 may acquire the surface and begin issuing rendering commands 536. A GPU wait packet 538 (with the key "1") is then placed on the GPU scheduler queue, and rendering commands 536 from device B 504 may be queued behind the wait packet 538.

In some instances, it is possible that a device may call an acquire synchronization API to render to a surface, but the currently owning device may not release the surface within an acceptable time. For example, the currently owning device may be an unreliable software component or may be dependent on the user performing some operation. In the event that the acquiring device is, for instance, a critical piece an the operating system, it would be undesirable to have that piece of the operating system wait indefinitely for a release from the currently owning device. Accordingly, some embodiments of the present invention allow a device to specify a timeout for an acquire call. The timeout would specify the amount of time the device is willing to wait for a release to be called and the surface to be acquired by the device. If the amount of time specified by a timeout is reached without the device acquiring access to the shared surface, the acquire is abandoned and the device may do other work.

With reference to FIG. 6, a flow diagram is provided illustrating a method 600 for using timeouts in a synchronized access to a shared surface in accordance with an embodiment of the present invention. As shown at block 602, a first device initially owns the share surface. While the first device owns the shared surface, a second device wishes to access the surface and calls an acquire synchronization API, as shown at block 604. The acquire call specifies a period of time for a timeout. For instance, the timeout period may be 400 milliseconds.

As shown at block 606, the timeout period specified for the acquire call for the second device is reached without the first device releasing the shared surface to allow the second device to access the surface. Based on the timeout period expiring, the second device abandons the acquire call and is free to perform other work, as shown at block 608.

As discussed previously, embodiments of the present invention include synchronization objects that control access to a shared surface, including an acquire synchronization object and a release synchronization object. The acquire synchronization object may include an acquire API call to gain access to a shared surface to rendering, while the release synchronization object may include a release API call to release access to a shared surface. An acquire API call and release API call in accordance with an embodiment of the present invention are shown in FIGS. 7 and 8, respectively.

Referring initially to FIG. 7, an acquire API call 700 is provided in accordance with an embodiment of the present invention. As shown in FIG. 7, the acquire API call 700 includes two parameters, a key parameter 702 and a dwMilliseconds parameter 704. The key parameter 702 indicates the key value being used in the acquire API call 700. The acquire API call 700 will succeed when a device that currently owns the surface releases the surface with the same key value. In the embodiment shown in FIG. 7, any 64-bit unsigned integer (UINT64) can be used as a valid key in the acquire API call 700. The dwMilliseconds parameter 704 specifies a time-out interval, in milliseconds. The function returns if the interval elapses without the shared surface being released on the key specified by the key parameter 702. In some embodiments, the dwMilliseconds parameter 704 may be set to zero, and the function tests to see if a release has been queued and returns immediately. Additionally, in some embodiments, the dwMilliseconds parameter 704 may be set to INFINITE, and the function's time-out interval never elapses.

Turning next to FIG. 8, a release API call 800 is shown in accordance with an embodiment of the present invention. As shown in FIG. 8, the release API call 800 includes a key parameter 802. The key parameter 802 specifies a key value for the release API call 800. A device making an acquire call using the same key value specified by the key parameter 802 may acquire the surface. In the embodiment shown in FIG. 8, the key parameter 802 for the release API call 800 may use any 64-bit unsigned integer (UINT64).

In embodiments, the behavior of the synchronization objects are supported by a variety of kernel objects. For instance, in some embodiments, fence synchronization objects are provided to support the behavior of the GPU wait. As discussed previously, the acquire and release APIs may employ key values for determining which device will acquire the surface next. The key values may be arbitrary. For instance, a device could acquire on a key value of 1 and then release on a key value of 0. In contrast, the fence value is a monotonically increasing value in kernel that is mapped to the API key value. Any time a new device acquires, the new device receives the current fence value plus one. The fence value is what actually gets queued on the GPU wait.

Fence synchronization objects may have two values associated with them: (1) QueuedValue, which is the value that the fence will have once all queued signal operations have been processed by the scheduler; and (2) CurrentValue, which is the current value of the fence (some signal operations may be queued but not processed yet). The scheduler enforces that both CurrentValue and QueuedValue are monotonically increasing values. Conceptually, a fence value represents a point in time. A fence is created with an initial value. After this, there are two valid operations on fences: (1) Signal(v); and (2) Wait(v). When a Signal(v) call is seen by the scheduler, it bumps up the QueuedValue of the fence to v and a Signal(v) packet to the fence is queued. When this queued Signal(v) packet is actually processed by the scheduler, the CurrentValue is bumped up to v and all contexts that were waiting on a fence value <=v are woken up. When the scheduler sees a Wait(v) call, it checks to see that a Signal(v) call has already been queued (but not necessarily processed). In other words, QueuedValue of the fence should be >=v. If so, it queues a Wait(v) packet onto the queue of that context. Once the Wait(v) packet is processed by the scheduler, that GPU context goes into a waiting state, waiting for the corresponding Signal packet. Once the corresponding Signal packet (on a different context) is processed, all contexts that were waiting on that fence value are woken up.

Additional kernel objects may be provided to support the behavior of the CPU wait. In an embodiment, kernel-mode structures are used to track shared synchronization objects, including a KEYEDMUTEX structure and a SYNCOBject structure. The KEYEDMUTEX structure is created for each shared synchronization object (equivalently, for every synchronized shared surface). This is a global structure that is assigned a handle from the global handle table. This structure is shared across all devices that access the synchronized shared surface and used for CPU synchronization of acquire and release calls. The SYNCOBJECT structure is used to track GPU synchronization objects. To handle synchronization across multiple processes/devices using the fence synchronization object, SYNCOBJECT has a global handle from the global handle table.

The KEYEDMUTEX structure stores synchronization object state that is of interest for CPU synchronization among all devices that are trying to access the shared surface. This may include a whether the shared surface is currently owned, the currently owning key, and a list of devices/events currently waiting on the CPU on different keys. SHAREDSYNCWAITER structures may be used to represent a device that is waiting on a particular key. This structure is allocated on the stack of the thread that is calling acquire, and the data members of this structure are used to communicate between the acquiring device and the release device.

As noted previously, embodiments of the present invention allow, among other things, different types of graphics APIs to render to a shared surface by facilitating access to the shared surface by the different graphics APIs. By way of illustration, suppose that an application developer is creating an application that displays complex, three-dimensional content in the background with user interface text in the forefront. Accordingly, the application developer may wish to use both a first graphics API that is optimized for rendering three-dimensional content and a second graphics API that is optimized for rendering text to render to a shared surface. By employing embodiments of the invention, the application developer may create an application that uses both graphics APIs to render to a shared surface, while synchronizing access to the surface by the two graphics APIs. For instance, when a shared surfaced is created for the application, the first graphics API that is optimized for rendering three-dimensional content may first access the surface to render three-dimensional content. When the first graphics API finishes rendering to the surface, the surface is released and the second graphics API that is optimized for rendering text may access the shared surface. After accessing the shared surface, the second graphics API may render text on top of the three-dimensional content previously rendered to the shared surface by the first graphics API.

Embodiments of the present invention may be employed locally when both the CPU and the GPU are located on the same computing device. Additionally, embodiments of the present invention may be employed in remoting scenarios such as a server/client environment in which an application is running on a server device while rendering is performed on a client device. For instance, FIG. 9 presents a simplified block diagram of a server/client environment 900 in which embodiments of the present invention may be employed. As shown in FIG. 9, a client device 902 communicates with a server device 904 via a network 906. Applications may be run using a CPU 910 located on the server device 904, while graphics are displayed using a GPU 908 located on the client device 902.

In such embodiments, CPU waits and signals would be performed on the server device 904, and the GPU waits and signals would be performed on the client device.

Synchronizing shared surfaces presents some interesting challenges for remoting scenarios. In particular, it is often desirable in remoting scenarios to avoid network roundtrips to the extent possible. This presents an interesting problem in the case of the acquire synchronization. In particular, as described above, a CPU wait is placed for the release call to ensure that once an acquire call is completed, it's safe for the device to queue up rendering commands. However, if the acquire and release calls were just sent over the network to the client, the return code from acquire call would need to be checked (through a roundtrip) to know whether it is safe for the device to proceed. Accordingly, in embodiments, the CPU synchronization is performed on both the server and client end. In particular, a CPU wait is performed at the client end in addition to being performed at the server end. A CPU wait at the client end also ensures proper ordering on the client GPU.

Another aspect of remoting scenarios is the use of timeouts. In accordance with some embodiments of the present invention, timeout operations in remoting scenarios are performed on the server side. Once acquire and release calls have been communicated from the server to the client, the client does not need to perform any timeout operations. In particular, based on the timeout operations on the server side, the operation has already timed out or it's guaranteed that the operation will eventually complete.

As can be understood, embodiments of the present invention provide for synchronized access to shared surfaces to enforce ordering of access and rendering to a shared surface. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for synchronizing access to a shared surface, the method comprising:

allowing a first rendering context to acquire access to a shared surface to render to the shared surface, wherein other rendering contexts are prevented from accessing the shared surface while the first rendering context has access to the shared surface, the first rendering context corresponding with a first type of graphics API;

receiving an acquire call originating from a first synchronization object for a second rendering context indicating that the second rendering context is attempting to access and render to the shared surface, wherein the acquire call for the second rendering context specifies a first key, and wherein the second rendering context is prevented from accessing the shared surface until the first rendering context releases the shared surface, the second rendering context corresponding with a second type of graphics API;

receiving a release call originating from a second synchronization object indicating that the first rendering context is releasing the shared surface; and based on the release call, allowing the second rendering context to access the shared surface to render to the shared surface.

2. The method of claim 1, wherein the release call for the first rendering context specifies a second key.

3. The method of claim 2, wherein the second rendering context is allowed to access the shared surface based on the first key matching the second key.

4. The method of claim 1, wherein the method is performed in a server/client environment.

5. The method of claim 1, wherein the acquire call specifies a timeout period for acquiring access to the shared surface for the second rendering context, wherein if the second rendering context does not acquire access to the shared surface within the timeout period, the acquire call is abandoned.

6. One or more computer-storage media having computer-useable instructions embodied thereon for performing a method for synchronizing access to a shared surface, the method comprising:

allowing a first rendering context to acquire access to a shared surface to render to the shared surface, the first rendering context corresponding with a first type of graphics API;

receiving, for a second rending context, a call originating from a first synchronization object to acquire access to the shared surface, the second rendering context corresponding with a second type of graphics API;

based on the acquire call, placing a wait packet on a GPU queue for the second rendering context, the wait packet including a first key value;

receiving rendering commands from the second rendering context and queuing the rendering commands behind the wait packet on the GPU queue, the wait packet preventing the rendering commands from the second rendering context from being executed by the GPU;

receiving, for the first rendering context, a call originating from a second synchronization object to release access to the shared surface;

based on the release call, placing a signal packet on the GPU queue;

based on the signal packet, allowing the second rendering context to acquire access to the shared surface; and executing the rendering commands from the second rendering context to render to the shared surface.

7. The one or more computer-storage media of claim 6, wherein the signal packet includes a second key value.

8. The one or more computer-storage media of claim 7, wherein the second rendering context acquires access to the shared surface and rendering commands from the second rendering context are executed based on the first key value matching the second key value.

9. The one or more computer-storage media of claim 6, wherein the acquire call specifies a timeout period for acquiring access to the shared surface for the second rendering context, wherein if the second rendering context does not acquire access to the shared surface within the timeout period, the acquire call is abandoned.

10. One or more computer-storage media having computer-useable instructions embodied thereon for performing a method for synchronizing access to a shared surface, the method comprising:

allowing a first rendering context to acquire access to a shared surface, wherein other rendering contexts are prevented from accessing the shared surface while the first rendering context has acquired the shared surface, the first rendering context corresponding with a first type of graphics API;

receiving, for a second rendering context, a call originating from a first synchronization object to acquire access to the shared surface, the second rendering context corresponding with a second type of graphics API;

based on the acquire call, placing a CPU wait on a CPU for the second rendering context, receiving, for the first rendering context, a call originating from a second synchronization object to release access to the shared surfaced;

based on the release call, placing a GPU signal on a GPU and a CPU signal on the CPU; and based on the CPU signal, placing a GPU wait on the GPU for the second rendering context and queuing rendering commands for the second rendering context behind the GPU wait on the GPU, the CPU wait and the GPU wait each specifying a first key value.

11. The one or more computer-storage media of claim 10, wherein the CPU signal and the GPU signal each specify a second key value.

12. The one or more computer-storage media of claim 11, wherein the second rendering context acquires access to the shared surface and rendering commands from the second rendering context are executed based on the first key value matching the second key value.

13. The one or more computer-storage media of claim 10, wherein the acquire call specifies a timeout period for acquiring access to the shared surface for the second rendering context, wherein if the second rendering context does not acquire access to the shared surface within the timeout period, the acquire call is abandoned.

14. The one or more computer-storage media of claim 10, wherein the CPU is located on a server machine and the GPU is located on a client machine, and wherein the CPU wait and CPU signal are performed on the server machine and the GPU wait and GPU signal are performed on the client machine.

* * * * *